June 28, 1960 H. J. NAESER ET AL 2,942,308
RESILIENT GASKET
Filed Oct. 3, 1956
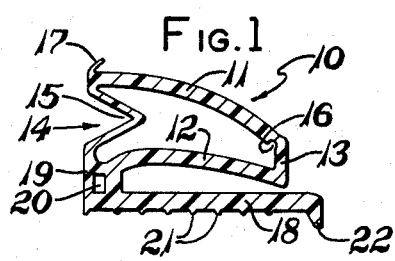
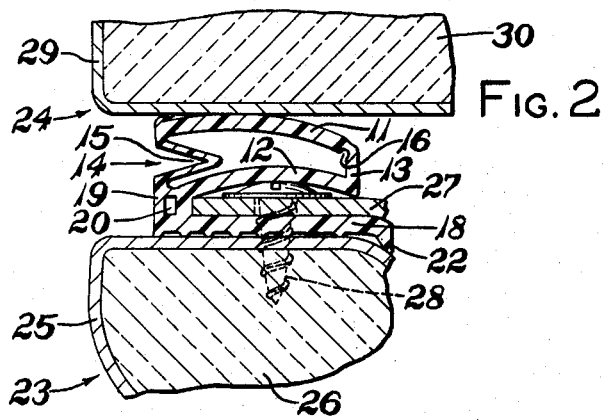
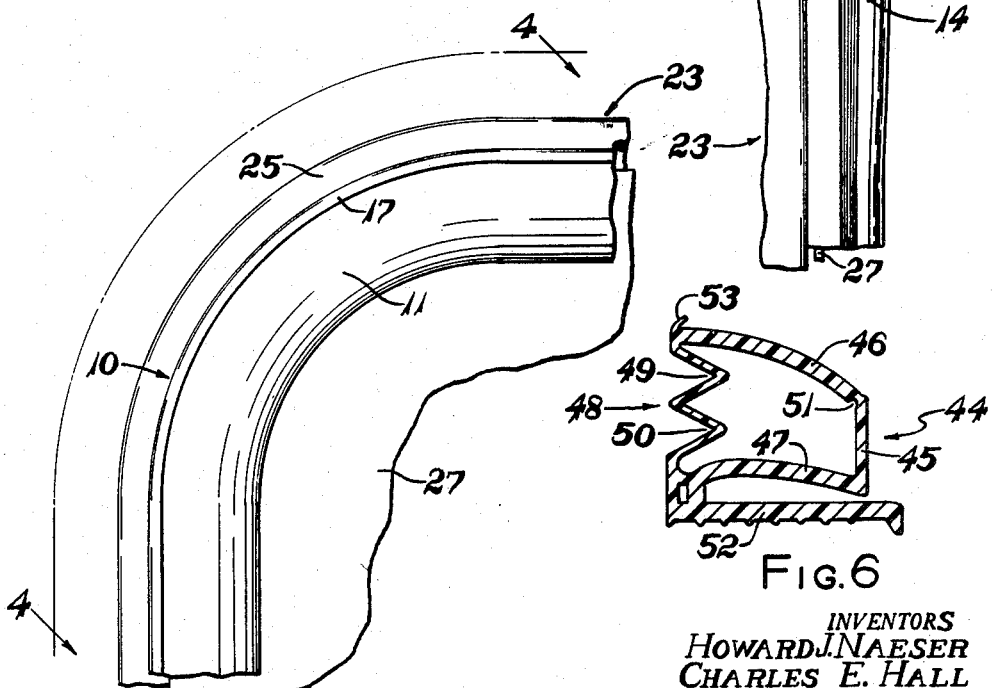
INVENTORS
HOWARD J. NAESER
CHARLES E. HALL
ARDELL J. BERGVALL
BY W. A. Shira, Jr.
ATTY.

United States Patent Office 2,942,308
Patented June 28, 1960

2,942,308
RESILIENT GASKET

Howard J. Naeser, Marietta, Ohio, Charles E. Hall, Williamstown, W. Va., and Ardell J. Bergvall, Trelleborg, Sweden, assignors to The B. F. Goodrich Company, New York, N.Y., a corporation of New York Filed Oct. 3, 1956, Ser. No. 613,780

7 Claims. (Cl. 20—69)

This invention relates to gaskets formed of resilient material and, more particularly, to gaskets used for effecting a compressive seal between two members such, for example, as the cabinet and door of a refrigerator.

Refrigerators, especially those of the type used in the home, employ a gasket or sealing means between the door and the body of the cabinet to cushion the door in closing, prevent the passage of air when the door is closed and provide a heat insulating barrier in this region. These gaskets are generally formed of rubber, synthetic plastic material or other elastomeric material which have rubber-like properties so they can deform under pressure and thus provide an effective seal between the cabinet and door even though there be irregularities in the surfaces of these two members. Conventional door gaskets are, however, relatively stiff so that considerable pressure is required to deform them sufficiently for effective sealing action around the entire door opening. This, in turn, has made it necessary to utilize door latches which provide a strong clamping force. Since the advent of home refrigerators of larger sizes, there have, in recent years, been numerous incidents of children being suffocated by being locked in the cabinets due to the fact that the doors could not be opened easily from the inside.

In order to insure against this hazard of children being trapped in household type refrigerators, latch release means have been installed on the interior of the cabinets or latching mechanisms have been devised which can be released by a force of light order exerted on the interior of the door. The latter type of latching means also have the advantage of causing less deformation of the door gaskets but unfortunately this has been at the sacrifice of effecting sealing action since conventional door gaskets are so stiff that they do not properly conform to surface irregularities when only a light compressive force is applied thereto. Hence, there is now an urgent need for an improved door gasket which can provide an effective compressive type seal between two members under very low sealing pressures. While this need has arisen primarily in conjunction with household type refrigerators it will be apparent that similar problems are present in other apparatus.

The principal object of this invention is, therefore, to provide an improved sealing means or gasket such that it can be readily deformed or compressed into effective sealing relationship with members engaged therewith under a low order of pressure.

Another object of the invention is to provide an improved sealing means or gasket formed of resilient material shaped as an elongated hollow body with the outer side face thereof provided with a longitudinally extending reentrant wall portion so that the gasket can conform to the surfaces of the members between which it is positioned with a minimum of pressure exerted thereon.

A further object of the invention is to provide an improved gasket for use between two members in a manner such that the gasket has both straight reaches and arcuate portions, the gasket comprising an elongated hollow body with a reentrant portion extending therearound on the outer side surface thereof so that the outer edge portions of the arcuate sections of the gasket expand to a thickness equal to or greater than the straight reaches of the gasket thus providing adequate sealing action at the corners as well as on the straight reaches of the gasket.

A still further object of the invention is to provide an improved gasket for refrigerator doors or the like, which gasket comprises an elongated hollow body formed of resilient rubber-like material with a reentrant portion extending along one side of the gasket and with the thickness of the wall of the reentrant portion being less than the thickness of the other walls of the body.

Another object of the invention is to provide an improved sealing gasket as defined in the preceding paragraph wherein a longitudinally extending region of hinging action is provided in a wall of the hollow body spaced from the reentrant portion thereby permitting ready yielding of the body in response to compressive force applied perpendicularly to the body without deformation of the material of the body.

A still more specific object of the invention is to provide a resilient gasket for effecting a soft compressive seal between two members, which gasket comprises a strip portion adapted to be attached to one of the members, a second strip portion integrally united to the first strip portion along a longitudinal edge thereof so that the strip portions extend in substantially superposed relationship, and an elongated hollow deformable body on the outer surface of the second strip portion with the said second strip portion forming one wall of the body, the said hollow body including a second wall portion integrally united with the second strip portion an a region separated from the region of union of the first and second strip portions and with a reentrant wall portion uniting the said second strip portion to the second wall portion.

The invention further resides in certain novel features of the construction and arrangement of the several parts of the novel sealing gasket, and further objects and advantages of the invention will be apparent to those skilled in the art to which the invention pertains from the following description of certain embodiments thereof described with reference to the accompanying drawing, forming a part of this application, and in which:

Fig. 1 is an enlarged transverse sectional view through the presently preferred construction of a sealing means or gasket embodying the invention;

Fig. 2 is an enlarged fragmentary, transverse sectional view illustrating the gasket shown in Fig. 1 positioned between the door and cabinet of a household refrigerator with the door in closed position;

Fig. 3 is an elevational view of a portion of the gasket shown in Figs. 1 and 2 disposed in an arc at a corner of a refrigerator door;

Fig. 4 is a fragmentary elevational view of the gasket shown in Fig. 3, when viewed as indicated by the dot and dash line and arrows 4—4 in Fig. 3;

Fig. 5 is a transverse sectional view similar to Fig. 1 but showing a modified form of gasket embodying the invention; and Fig. 6 is a transverse sectional view similar to Figs. 1 and 5 but showing another modification of the sealing gasket embodying the invention.

Referring first to Fig. 1 of the drawing which illustrates the presently preferred form of the improved gasket or sealing means in transverse section, it will be seen that the gasket comprises a thin-walled hollow body 10 formed of resilient elastic material. This material may be natural or synthetic rubber, but, as here shown, the gasket is preferably formed of a flexible and resilient plastic such as plasticized polymerized vinyl resin, for example, polyvinyl chloride. It will be apparent, however, that other materials having similar characteristics of flexibility, resiliency, and elasticity may be employed.

The hollow body 10 may be defined as formed of spaced wall portions 11 and 12 which diverge transversely from a region of integral union 13. The opposite edges of the diverging wall portions 11 and 12 are integral with a reentrant portion 14. In the preferred embodiment, the reentrant portion 14 is V-shaped in cross section with the apex 15 of the reentrant angle disposed inwardly of the body and with the thickness of the reentrant portion being less than the thickness of the wall portions 11 and 12. The hollow body 10 is elongated with the length thereof being sufficient to extend the entire distance of the space which is to be closed. For example, in the case of a refrigerator door gasket, the length of the hollow body is sufficient to extend entirely around the door adjacent the cabinet opening. Preferably the end portions of the gasket are united together by heat sealing or other means so that the opening of the hollow body 10 is continuous.

The hollow body 10 is easily compressed or deformed by light pressure due to the hinging action of the reentrant portion 14 which acts in the nature of a bellows. This compressing or deforming is preferably facilitated by the provision of a region of hinging or bending in a side wall of the body. Thus, at a location spaced from the reentrant portion 14 a longitudinally extending groove or region of lesser thickness 16 is provided adjacent the region where the wall member 11 joins the portion 13 so that the wall portion 11 acts like a lever with the region of the wall at the groove 16 being the pivot. Additional accommodation to surfaces having excessive irregularities is provided by a protruding lip portion 17 provided on the outer surface of the wall portion 11 at the region of the reentrant portion 14. This protuberance or lip is of thin cross section and preferably is angularly directed to extend toward the portion 13 in spaced relation to the hollow body 10 so that the lip 17 can be contacted by and effect at least partial sealing with a member, such as cabinet 24, before the hollow body 10 is subjected to compression.

A sealing gasket comprising the hollow body 10 with reentrant side wall 14, as just described, can be employed between two members by securing the body to one of the members in any desired manner. This could, for example, be accomplished by forming the wall portion 12 of the hollow body, which is strip-like, in a manner such that it could be cemented or otherwise adhered to one of the members with which the gasket is employed. Preferably, however, the hollow body 10 is formed with an integral attaching portion 18 which is here shown as a strip-like part extending longitudinally in substantial alignment with the hollow body 10 and attached thereto by a connecting portion 19 united with the wall or strip-like portion 12 of the hollow body adjacent the reentrant portion 14. In order that this connecting portion 19 of the body may be sufficiently strong to prevent damage its cross section is relatively massive but excessive weight and unnecessary material may be eliminated by providing a hollow center or core 20 extending therethrough.

The strip-like portion 18 is formed in a configuration of the type customarily employed for the structure with which the gasket is to be used and, hence, will vary from one type of installation to another. For example, it is desirable for a sealing gasket in one popular form of refrigerator door to have the lower surface of this strip-like portion 18 provided with longitudinally extending ribs 21 and to have the inner edge 22 of the strip provided with a leg portion extending at substantial right angles to the inner surface of the strip. These features are not, however, per se, part of the invention and may be varied as dictated by the requirements of a particular refrigerator or other structure in which the gasket is used.

The improved nature and functioning of the sealing strip of this invention can best be understood with reference to Fig. 2 which shows a fragment of door 23 and the cabinet 24 of a household type refrigerator with the door closed and the gasket of Fig. 1 positioned therebetween. The construction of the refrigerator per se forms no part of this invention and may be of conventional nature. The refrigerator here shown has the door 23 thereof formed of sheet metal 25, the hollow interior of which is filled with insulation 26. The strip-like part 18 of the gasket is held in fixed relationship to the door shell 25 by plate-like member 27 that fits between the hollow body 10 and the strip-like portion 18 of the gasket. The parts may be held in assembled relationship by suitable sheet metal screws or the like 28 as is well understood in the art. The wall of the cabinet 24 of the refrigerator likewise is formed of a sheet metal shell 29 filled with insulation 30.

The sealing member or gasket attached to the door 23 is disposed in a configuration corresponding to the opening in the cabinet 24 and may be formed of one piece with the ends united together or may be made in several pieces if desired. The function of the sealing means or gasket is to prevent direct contact of the door 23 with the cabinet 24 and yet to effectively prevent heat and air transfer to and from the interior of the cabinet and this must be achieved with relatively low pressure upon the gasket. This is possible with the improved sealing means or gasket of this invention since the reentrant or bellows-like portion 14 is readily collapsed or deformed when the door is brought to a closed position this deformation of the gasket being facilitated by the region of hinging provided by the groove 16 while additional sealing action and compensation for slight irregularities in the surface of the sheet metal 25 of the door or 29 of the cabinet is provided by the lip or protuberance 17 on the outer surface of the hollow body 10. The position of the gasket when the door of the refrigerator is closed is substantially as shown in Fig. 2 from which it will be seen that the material of the gasket is not itself deformed. Hence, when the door is opened the gasket can immediately return to an expanded position similar to that shown in Fig. 1.

In addition to the improved action of the gasket in readily collapsing or deforming and recovering under the application and release of light force, the improved construction has the further advantage that when it is curved around an arc in a plane containing a face of the strip portion 18, the outer edge is not pulled to a lower elevation than the remaining portions of the gasket adjacent such arcuate region as has frequently been the case in hollow gaskets of other constructions. This will be understood with reference to Figs. 3 and 4 which show a fragment of a refrigerator door with the improved gasket secured thereto in the region of a curved "corner" of the door. In such a location the hollow body 10 of the gasket will be bent to correspond to the contour of the periphery of the door. This, due to the reentrant or bellows portion 14 of the gasket, will result in a slight elevation of the outer or upper edge of the gasket as indicated at 31 in Fig. 4. That is to say, the bending of the gasket in the arcuate form shown in Fig. 3 tends to cause the reentrant or bellows portion 14 to open further by increasing the angularity of the reentrant portion as will be apparent from the curved lines shown for the edges of the gasket in the region indicated 31 in Fig. 4.

This raising of the outer edge of the gasket is an advantage because it ensures adequate sealing between the door and cabinet at this region, it being remembered that the gasket is easily compressed or deformed by light pressure so that the slight raising at the outer edge presents no problem in effective closing of the door but rather provides a margin of safety in this region where heretofore it has been difficult to provide for the proper action of the gasket. This is in contrast to the action of conventional gaskets of the hollow body type wherein the necessary bending thereof at the arcuate corners of a door has tended to decrease the height or thickness of the gasket and, since such conventional gaskets are relatively stiff, this has meant that there is not full engagement of the gasket with the cabinet at the corners even though considerable pressure is exerted upon the gasket at other locations where the gasket is not curved.

The improved gaskets of this invention may be shaped to include a portion of arcuate configuration, of relatively small radius, as indicated in Fig. 3, by simply placing the gaskets in place on the door while under a longitudinal tension of low order such that the material conforms to the desired curvature. Alternatively, the strip portion 18 of the gasket may be notched, if desired, to facilitate disposal in the arcuate configuration, it being remembered that the reentrant portion 14 allows the hollow body 10 to alter its shape more readily than is possible in the flat strip portion 18 so that the hollow body need not be cut.

The principles of this invention may be applied to gaskets or sealing strips having configurations somewhat different from that shawn in Fig. 1 in order to adapt the gaskets to the conditions of a particular installation. For example, the gasket shown in Fig. 5 comprises a hollow body 32 one side of which is provided by a part of a strip portion 33 which is united to the attaching strip portion 34 of the gasket by a short wall portion 35 of dimensions such as to readily accommodate an attaching plate and screws or other attaching members not shown. As here indicated, the strip-like portion 33 has its free end disposted arcuately towards the strip-like portion 34 so that a hollow region is formed between the strip 33 and the attaching plate or member to accommodate the heads of screws or other attaching members as is well known in the art.

The hollow body 32 further comprises an angularly extending wall portion 36 which has one edge attached to the strip 33, intermediate the side edges of the latter, and its other edge attached to a reentrant or bellows portion 37. As in the preferred construction, the thickness of the material in the reentrant portion 37 is preferably less than in the wall portion 36 and strip-like portion 33 so that the hollow body 32 can be easily collapsed or compressed by the application of light pressure. To facilitate this action, the wall portion 36 preferably has a hinging region provided by a longitudinally extending groove 38 or region of reduced thickness at a location spaced from the reentrant portion 37 as will be readily apparent from an inspection of Fig. 5. To further facilitate the action of the reentrant portion and ensure sealing action of the gasket with the surface of the member with which the gasket engages even though that surface is somewhat irregular, the hollow body 32 is preferably provided along its apex or outermost edge with one or more sealing lips or projections, two of which 39 and 40 are here shown. The attaching strip portion 34 of the hollow body may have suitable projections such as the leg portions 41 and 42 and intermediate ribs such as 43 to facilitate reception and proper attachment to the refrigerator door or other member with which the gasket is united, these features being provided and shaped in accordance with the nature of the installation in which the gasket is employed.

The modified form of gasket shown in Fig. 5 is particularly advantageous for use where the gasket must be bent around an arc of relatively small radius, for example, in the order of one inch which could not be effected without loss of sealing action by conventional gaskets so that heretofore it has been necessary to employ a mitered corner or the like. When employing the improved gasket of the Fig. 5 construction about a curvature of small radius, the lower attaching strip 34 may be notched if this is necessary. The upper strip 33 may likewise be notched to a location just short of the wall 36 of the hollow body portion. This will permit the strip to be readily curved in the plane of its flat portion without injury to the hollow body portion 32 or loss of the functional characteristics of the gasket. In fact, the sealing action at the corners of a refrigerator door where the curvature occurs is accentuated since the reentrant or bellows portion 37 tends to increase its angle when the gasket is curved. This characteristic and the general functioning of the hollow body 32 will be readily apparent from the above description of the embodiment illustrated in Figs. 1 to 4 and, hence, need not be repeated.

In some installations it is desirable that the gasket or sealing member have a thickness greater than that which can be properly achieved with a single angle reentrant portion of the type indicated in Figs. 1 to 5. In such instances, the principles of this invention can be employed by forming the gasket with more than one reentrant angle. Thus, as indicated in Fig. 6, the hollow body 44 is formed by an inner side wall 45 from which walls 46 and 47 transversely diverge in spaced superposed relationship with the opposite edges of the latter being united by a double reentrant or bellows portion 48. The reentrant portion 48 has two reentrant angles 49 and 50 so that this wall of the gasket is substantially W-shaped in cross section. Preferably, the thickness of the material comprising the reentrant wall portion 48 is less than that of the wall portions 45, 46, and 47 to ensure that deformation of the gasket under sealing pressure is effected by decrease of the reentrant angles 49 and 50. To further facilitate this functioning the hollow body 44 is preferably provided with a region of hinging action spaced from the reentrant portion 48, for example, by providing a longitudinally extending groove or recess 51 in the region where the wall portions 45 and 46 merge. The hollow body 44 can be attached to the refrigerator door or other member with which it is employed by any suitable means as, for example, by forming the body with an attaching strip portion 52 similar to, and functioning in the same manner, as the strip portion 18 of Fig. 1. Also, the outer edge of the hollow body 44, in the region of the reentrant portion 48, preferably has a flexible lip portion or protuberance 53 similar to the portion 17 of Fig. 1.

It will be observed that the gasket of the type shown in Fig. 6 differs from that shown in Fig. 1 only by virtue of the increased dimension of the wall portion 45 and the inclusion of a second reentrant angle in the reentrant wall 48. This permits the gasket to seal a larger space or gap between the two members with which it is engaged. The mode of operation of the gasket is, however, essentially the same as that of the gasket illustrated in Fig. 1.

The gaskets herein described and illustrated are all shown as having the several wall and/or strip portions thereof formed integrally. This may be advantageously achieved by extruding the material through a suitable extrusion die as will be well understood. The invention is not, however, limited to gaskets formed of one piece extrusions since it is possible to assemble the gaskets from several separate strips or parts and unite the parts by suitable adhesives, heat sealing, or other expedients. It will also be apparent that the principles of this invention can be incorporated in sealing gaskets of somewhat different configurations from those here specifically shown and described and that additional features and advantages of invention will no doubt hereafter become evident to those familiar with the art. Therefore, the invention is not to be considered as limited to the precise details of construction herein set forth except as may be required by the spirit and scope of the subjoining claims.

Having thus described the invention, we claim:

1. A resilient gasket comprising an extrusion of flexible rubber-like material for effecting a soft compression seal between two members adjacent the periphery of at least one of the members, the said gasket comprising a strip portion adapted to be attached to one of the members, a second strip portion extending in spaced superposed relationship to the first strip portion with the said portions integrally united along one longitudinal edge of the portions, and an elongated hollow deformable body on the outer surface of said second strip portion with the said second strip portion forming one wall of said body, the said hollow body including a second wall portion integrally united with said second strip portion in a region spaced from the union of said first and second strip portions with the second wall portion extending toward said union of the strip portions in spaced diverging relationship to the said second strip portion and with the outer edge of said second wall substantially aligned with the edge of the union of the strip portions, the said second wall portion being adapted to be engaged by the other of the members between which the gasket is placed, and a reentrant wall portion uniting the said outer edge of the second wall portion to the second strip portion in the region of the union of the strip portions, the reentrant wall portion having a region of flexure extending longitudinally thereof intermediate its unions with the said second strip portion and the said second wall portion.

2. A resilient gasket as defined in claim 1 wherein the said second wall portion has a longitudinally extending groove spaced from said reentrant wall portion to provide a region of flexure for said second wall portion.

3. A resilient gasket as defined in claim 1 wherein the wall thickness of said reentrant wall portion is less than that of the other wall portions of said body.

4. A resilient gasket as defined in claim 1 and further comprising a resilient lip portion extending outwardly from said hollow body on a surface of the said second wall portion adapted to be engaged by one of the two members between which the gasket is placed.

5. A resilient gasket as defined in claim 1 wherein the said reentrant wall portion is substantially V-shape in cross-section.

6. A resilient gasket as defined in claim 1 wherein the said reentrant wall portion is substantially W-shape in cross-section providing a plurality of regions of flexure extending longitudinally of the reentrant wall portion.

7. A resilient gasket comprising an extrusion of rubber-like material for effecting a soft compression seal between two members adjacent the periphery of at least one of the members, the said gasket comprising a strip portion adapted to be attached to one of the members, a second strip portion extending in spaced superposed relationship to the first strip portion with the said portions united along one longitudinal edge of the portions, and an elongated hollow deformable body on the outer surface of said second strip portion with a part of said second strip portion forming one wall of said body, the said hollow body including a second wall portion integrally united with said second strip portion in a region intermediate the side edges of the latter with said second wall portion extending toward said union of the strip portions in spaced diverging relationship to said second strip portion and with the outer edge of said second wall portion substantially aligned with the edge of the union of the strip portions, the said second wall portion being adapted to be engaged by the other of the members between which the gasket is placed, and a reentrant wall portion uniting the said outer edge of the second wall portion to said second strip portion in the region of the union of the strip portions, the said reentrant wall portion having a region of flexure extending longitudinally thereof intermediate its unions with the said second strip portion and the said second wall portion.

References Cited in the file of this patent
UNITED STATES PATENTS

| | | |
|---|---|---|
| 984,232 | Monroe | Feb. 14, 1911 |
| 2,263,831 | Welch | Nov. 25, 1941 |
| 2,591,833 | Kreimendahl | Apr. 8, 1952 |
| 2,636,228 | Morton | Apr. 28, 1953 |
| 2,659,118 | Anderson et al. | Nov. 17, 1953 |
| 2,700,194 | Rasmussen | Jan. 25, 1955 |
| 2,736,076 | Bush et al. | Feb. 28, 1956 |

UNITED STATES PATENT OFFICE

CERTIFICATE OF CORRECTION

Patent No. 2,942,308  June 28, 1960

Howard J. Naeser et al.

It is hereby certified that error appears in the printed specification of the above numbered patent requiring correction and that the said Letters Patent should read as corrected below.

Column 2, line 33, for "portion an" read -- portion in --; column 5, line 21, for "shawn" read -- shown --; lines 29 and 30, for "disposted" read -- disposed --.

Signed and sealed this 27th day of December 1960.

(SEAL)
Attest:
KARL H. AXLINE
Attesting Officer

ROBERT C. WATSON
Commissioner of Patents